United States Patent [19]

Shimoma et al.

[11] Patent Number: 4,881,015

[45] Date of Patent: Nov. 14, 1989

[54] COLOR CATHODE-RAY APPARATUS HAVING AN IMPROVED DEFLECTION UNIT

[75] Inventors: Taketoshi Shimoma, Isesaki; Katsuei Morohashi, Menuma; Jiro Shimokobe, Fukaya, all of Japan

[73] Assignee: Kabushiki Kaishia Toshiba, Kawasaki, Japan

[21] Appl. No.: 244,824

[22] Filed: Sep. 15, 1988

[30] Foreign Application Priority Data

Sep. 16, 1987 [JP] Japan ................................. 62-229453
Apr. 27, 1988 [JP] Japan ................................. 63-102708

[51] Int. Cl.$^4$ ............................................. H01J 29/56
[52] U.S. Cl. ..................................... 315/371; 315/370
[58] Field of Search ........................ 315/370, 371, 368

[56] References Cited

U.S. PATENT DOCUMENTS 4,704,564  11/1987  Ito et al. ............................... 315/368

FOREIGN PATENT DOCUMENTS

| 55-115243 | 9/1980 | Japan . |
| 57-145254 | 9/1982 | Japan . |
| 57-206184 | 12/1982 | Japan . |
| 58-14453 | 1/1983 | Japan . |
| 60-125069 | 7/1985 | Japan . |

Primary Examiner—Theodore M. Blum
Attorney, Agent, or Firm—Cushman, Darby & Cushman

[57] ABSTRACT

In a color cathode-ray apparatus, electron beams emitted from an electron gun assembly are deflected along horizontal and vertical axes by horizontal and vertical deflecting units. The horizontal deflecting unit includes first and second horizontal deflecting yokes which are located such that the center of the second horizontal deflecting yoke is defined between the center of the first horizontal deflecting yoke and the electron gun assembly. First and second horizontal deflection currents are supplied to the first and second horizontal deflecting yokes and are changed in different manners, in accordance with a degree to which the electron beams are to be deflected, and the first and seocnd deflection yokes generate pincushion and barrel magnetic fields, respectively.

13 Claims, 7 Drawing Sheets

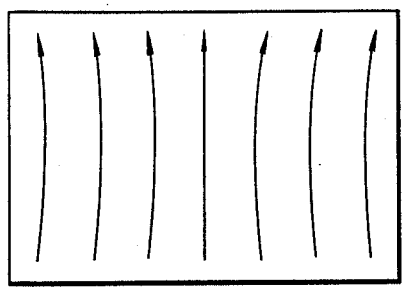
F I G. 1A
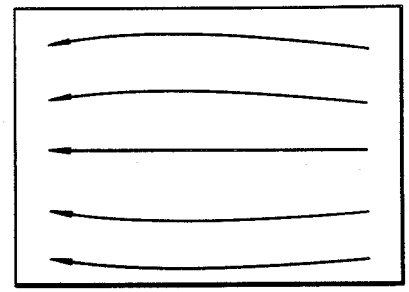
F I G. 1B
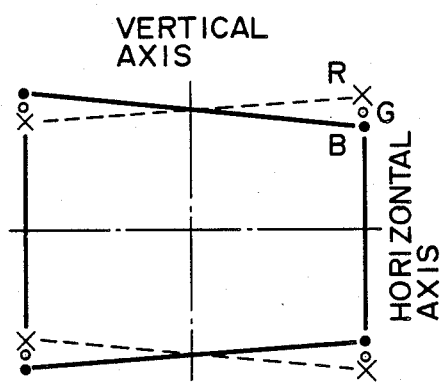
F I G. 2A
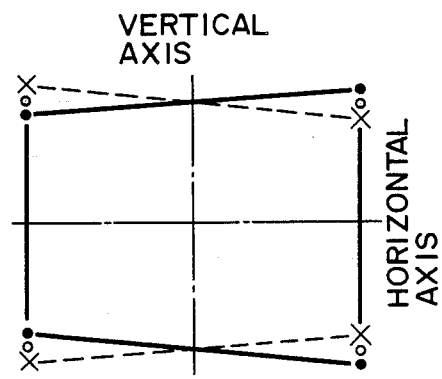
F I G. 2B
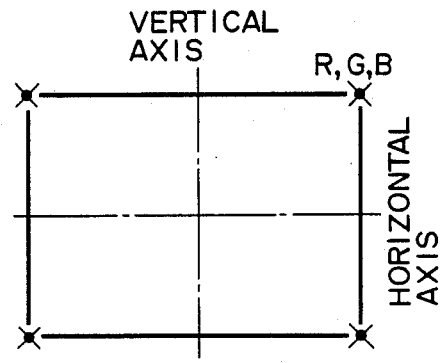
F I G. 2C

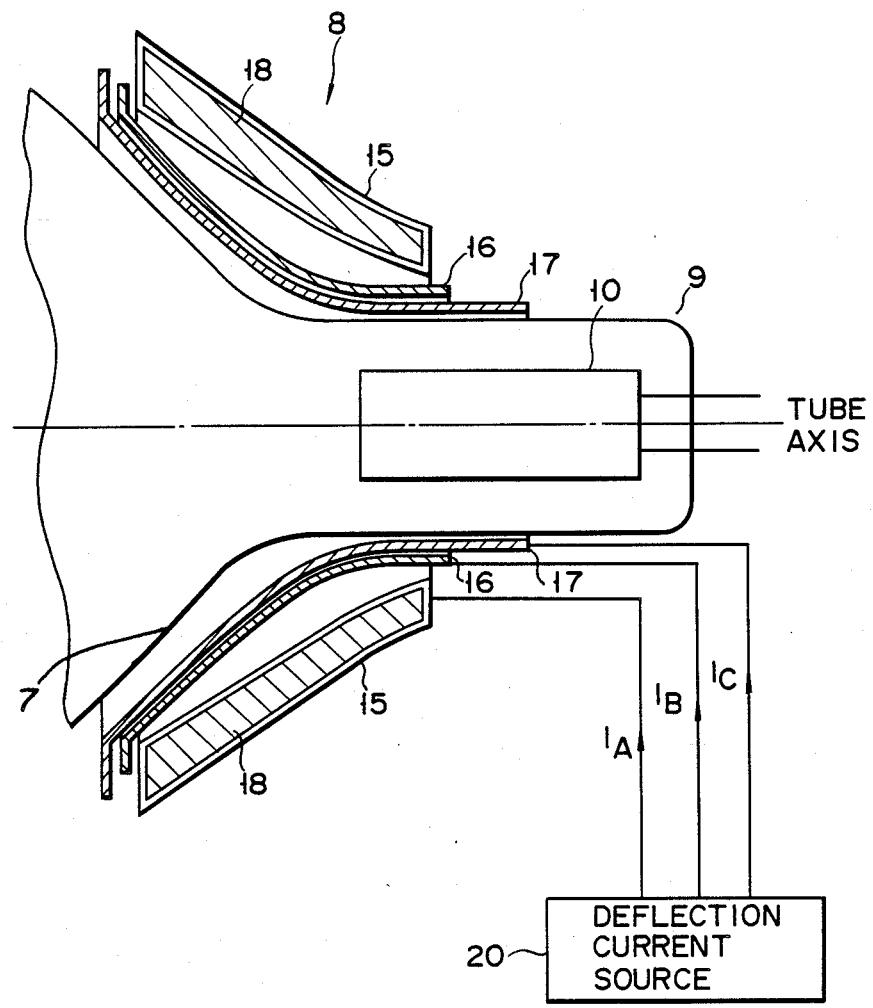
F I G. 5

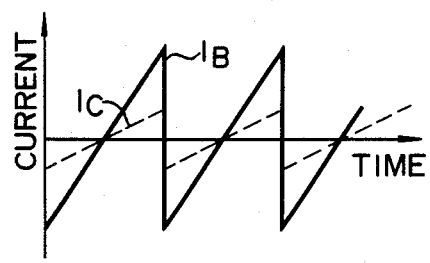
F I G. 8A
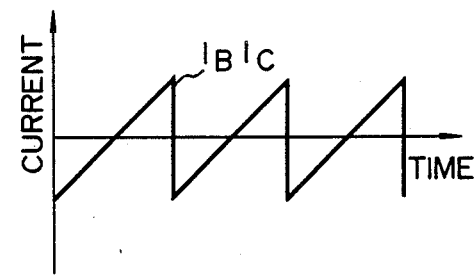
F I G. 8B
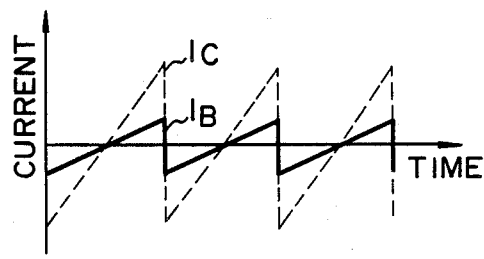
F I G. 8C
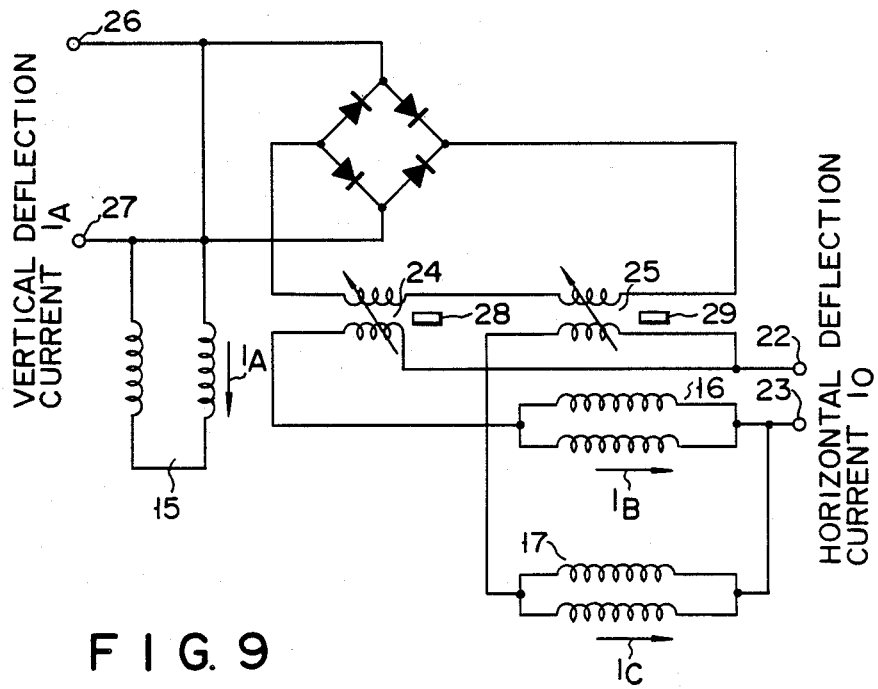
F I G. 9

COLOR CATHODE-RAY APPARATUS HAVING AN IMPROVED DEFLECTION UNIT

BACKGROUND OF THE INVENTION

1. Field of the Invention

The present invention relates to a color cathoderay tube and, more particularly, to a color cathode-ray tube which has an improved deflection unit in which three electron beams are accurately converged on a screen, and neither a negative cross pattern nor a positive cross pattern will appear on any part of the screen.

2. Description of the Related Art

Of color cathode-ray tubes having a shadow mask, the most prevalent one is the type comprising an in-line electron gun assembly having three electron guns and a shadow mask having slot-like apertures. This type of color cathode-ray tube has a deflection yoke designed to generate such horizontal and vertical deflection magnetic fields that the red, green and blue electron beams pass through an aperture at the same time. These deflection magnetic fields are known, as is disclosed in, for example, Japanese Patent Disclosure No. 57-1857. More specifically, the horizontal deflection magnetic field is shaped like a pin-cushion as is shown in FIG. 1A, and the vertical deflection magnetic field is shaped like a barrel as is illustrated in FIG. 1B. When the cathode-ray tube has a relatively small deflection angle, these magnetic fields deflect the three electron beams correctly, thus achieving good beam-convergence on any part of the screen. Therefore, the tube need not have a device for correcting the beam-convergency. When the cathoderay tube has a great deflection angle, e.g., 100° or 110°, a convergence error occurs which is generally called "crossing of vertical lines,". It is regarded as impossible to correct this convergence error even if the horizontal and vertical deflection magnetic fields are changed in characteristic, as is disclosed in Iwasaki et al. "SST Deflection Yoke for Use in an In-Line High-Precision Color" in the technical report of Journal of Television Society of Japan, ED619, 1982. More precisely, when a saddle-and-toroidal deflection yoke is incorporated in a color cathode-ray tube of a great deflection angle, positive anisotropic astigmatism occurs, inevitably forming a positive cross pattern (FIG. 2A) on the screen. When a saddle-and-saddle deflection yoke is incorporated in a color cathode-ray tube of a large deflection angle, negative anisotropic astigmatism occurs, inevitably forming a negative cross pattern (FIG. 2B) on the screen. Either anisotropic astigmatism is mainly attributed to the fact that the centers of deflection of the magnetic fields, which have been generated by the horizontal and vertical deflection coils, respectively, take different positions.

It is generally considered the most desirable that when a saddle-and-toroidal deflection yoke is used, the saddle coil for deflecting the electron beams horizontally have a center of deflection located closer to the electric guns than the center of deflection of the toroidal coil for deflecting the beams vertically. If the centers of deflections of both coils take the same position, a convergence error, generally known as a positive cross pattern (FIG. 2A), will be made. The positive cross pattern is corrected into such a neutral one as is shown in FIG. 2C when the center of deflection of the saddle coil is deviated toward the electron guns from the center of deflection of the toroidal coil. When the center of deflection of the saddle coil is further deviated toward the electron guns, however, a negative cross pattern will appear on the screen as is shown in FIG. 2B. Therefore, it is generally considered possible to change a positive or negative cross pattern to a neutral cross pattern by adjusting the positional relation between the horizontal deflection coil and the vertical deflection coil.

Indeed, neither a positive cross pattern nor a negative cross pattern appear on the horizontal axis, at point P0 in the region near this axis, or at points P2 in the corner regions when the positional relation of the horizontal deflection coil and the vertical deflection coil is properly adjusted. However, a positive cross pattern and a negative cross pattern are formed at other points, such as point P1 between the horizontal axis and any corner region, or point P3 located at the outer edge of any corner, even if the positional relation of the coils is adjusted. Besides, the cross patterns appearing at point P1 and the outer edge of the corner are inverted. This inversion of cross patterns is prominent in proportion to the deflection angle or the size of the screen. Therefore, in the conventional color cathode-ray, a magnetic plate or the like is attached to the deflection yoke in order to reduce the change of forming positive and negative cross patterns. The use of the magnetic plate, however, does not reduce this chance sufficiently.

SUMMARY OF THE INVENTION

The object of the present invention is to provide a color cathode-ray apparatus which has a good convergence characteristic.

According to the invention, there is provided a color cathode-ray apparatus which comprises:

- an evacuated envelope having a tube axis and horizontal and vertical axes intersecting the tube axis at right angles and intersecting each other at right angles;
- a phosphor screen incorporated within said evacuated envelope;
- an in-line electron gun assembly for emitting three electron beams toward said phosphor screen;
- horizontal deflection means for generating a horizontal deflection magnetics field thereby to deflect the electron beams along said horizontal axis;
- vertical deflection means for generating a vertical deflection magnetic field thereby deflecting the electron beams along the vertical axis, the vertical deflection means including a first deflection coil, having a first deflection center, for generating a first magnetic field, and a second deflection coil, having a second deflection center, for generating a second magnetic field the first and second deflection centers are located at different points on the tube axis and the second deflection center is defined as being between the first deflection center and the electron gun assembly; and
- current-supplying means for supplying a horizontal deflection current, a first vertical deflection current and a second vertical deflection current to said horizontal deflection means, said first vertical deflection means and said second vertical deflection means, respectively, thereby energizing the horizontal deflection means and the first and second vertical deflection means, the first and second vertical deflection currents being changed in different manners, in accordance with a degree to which the electron beams are to be deflected vertically.

Further, according to the invention, there is provided a color cathode-ray apparatus which comprises:

an evacuated envelope having a tube axis and horizontal and vertical axes intersecting the tube axis at right angles and intersecting each other at right angles;
a phosphor screen incorporated within the evacuated envelope;
an in-line electron gun assembly for emitting three electron beams toward the phosphor screen;
vertical deflection means for generating a vertical deflection magnetic field thereby deflecting the electron beams along the vertical axis;
horizontal deflection means for generating a horizontal deflection magnetic field thereby to deflect the electron beams along the horizontal axis, the horizontal deflection means including a first deflection coil, having a first deflection center, for generating a first magnetic field, and a second deflection coil, having a second deflection center, for generating a second magnetic field, the first and second deflection centers being located at different points on the tube axis and the second deflection center being defined between the first deflection center and the electron gun assembly; and
current-supplying means for supplying a vertical deflection current, a first horizontal deflection current and a second horizontal deflection current to the vertical deflection means, the first horizontal deflection means and the second horizontal deflection means, respectively, thereby energizing the vertical deflection means and the first and second horizontal deflection means, the first and second horizontal deflection currents being change in different manners, in accordance with a degree to which the electron beams are to be deflected horizontally.

Furthermore, according to the invention, there is provided an evacuated envelope having a tube axis and horizontal and vertical axes intersecting the tube axis at right angles and intersecting each other at right angles;
a phosphor screen incorporated within the evacuated envelope;
an in-line electron gun assembly for emitting three electron beams toward the phosphor screen;
vertical deflection means for generating a vertical deflection magnetic field thereby deflecting the electron beams along the vertical axis;
horizontal deflection means for generating a horizontal deflection magnetic field thereby deflection the electron beams along said horizontal axis, wherein one of the vertical deflection means and the horizontal deflection means includes a first deflection coil for generating a barrel magnetic field, and a second deflection coil for generating a pincushion magnetic field; and
current-supplying means for supplying a main deflection current, a first deflection current and a second deflection current to the other deflection means, the first deflection means and the second deflection means, respectively, thereby energizing the vertical and horizontal deflection means, the first and second deflection currents are changed in different manners, in accordance with a degree to which the electron beams are to be deflected.

BRIEF DESCRIPTION OF THE DRAWINGS

FIGS. 1A and 1B are diagrams showing the distribution of a horizontal deflection magnetic field of a pincushion type, and the distribution of a vertical deflection magnetic field of a barrel type;

FIGS. 2A, 2B, and 2C show a positive cross pattern, a negative cross pattern, and a neutral cross pattern, respectively;

FIG. 5 is an enlarged view showing a part of the cathode-ray tube shown in FIG. 4;

FIGS. 8A, 8B and 8C show the waveforms of the AC currents which can be supplied to the first and second horizontal deflection coils shown in FIG. 5;

FIG. 9 is a circuit diagram showing the deflection current source shown in FIG. 5;

DETAILED DESCRIPTION OF THE PREFERRED EMBODIMENTS

Figure 4:
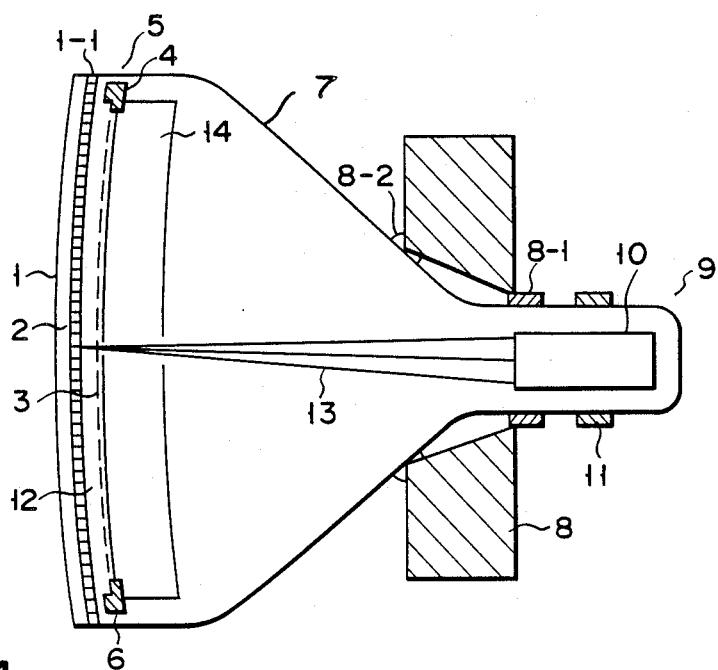
FIG. 4 is a sectional view of a color cathode-ray tube which is one embodiment of the present invention.

FIGS. 4 and 5 schematically illustrate a color cathode-ray tube according to the present invention. As is shown in FIG. 4, the color cathode-ray tube comprises an envelope, in-line electron gun assembly 10 incorporated in the envelope, and shadow mask 3 provided within the envelope. The envelope of this tube has face plate 1 and phosphor screen 2 formed on the inner surface of plate 1. Screen 2 consists of dot-shaped or stripe-shaped phosphor layers which are arranged orderly. These phosphor layers emit red, green and blue light rays when the electron beams emitted from the electron gun assembly are applied to them.

Several panel pins 5 protrude from the inner periphery of skirt 1—1 of face plate 1. Springs 6 connect mask frame 4 to pins 5. Hence, mask frame 4 is secured to face plate 1. Mask frame 14 supports shadow mask 3, forming a predetermined gap between phosphor screen 2 and shadow mask 3. Shadow mask 3 has a number of apertures 12. An inner shield 14 is fastened to mask frame 4. Funnel 7. which is a part of the envelope, is connected to skirt 1—1 of face plate 1. Neck 9, which is also a part of the envelope, extends from funnel 7. Electron gun assembly 10 is arranged within neck 9. Deflection unit 8 is mounted on neck 9. More specifically, deflection unit 8 is fastened to neck 9 by means of support 8-1 and steadily mounted on funnel 7 by means of wedges 8-2. Ring-shaped magnet 11 is also mounted on neck 9.

Electron gun assembly 10 has three electron guns for emitting a red electron beam, a green electron beam, and a red electron beam, respectively, toward phosphor screen 2. The three electron guns are arranged side by side in horizontal direction, thus forming an in-line gun assembly which is predominantly used in color cathode-ray tube generally called "three-beam, shadow mask tubes." Gun assembly 10 is designed to apply the red, green and blue beams onto the same point on phosphor screen 2. Deflection unit 8 is designed to generate a magnetic field which causes the three electron beams to pass through the same aperture of shadow mask 3.

As is understood from FIG. 5, deflection unit 8 (i.e., a deflection yoke) comprises one toroidal coil 15 and two saddle coils 16 and 17. Toroidal coil 15, which functions as a vertical deflection coil, is formed of a ferrite core 18 and a wire wound around core 18. It generates a magnetic field whose intensity is distributed as indicated by curve I in FIG. 6A and 6B. Saddle coils 16 and 17, both functioning as horizontal deflection coils, generate magnetic fields whose intensities are distributed as indicated by curve II in FIG. 6A and curve III in FIG. 6B, respectively. Saddle coil 17 is mounted partly on funnel 7 and partly on neck 9; saddle coil 16 is mounted on coil 17; and toroidal coil 15 is mounted on coil 16.

Figure 6A:
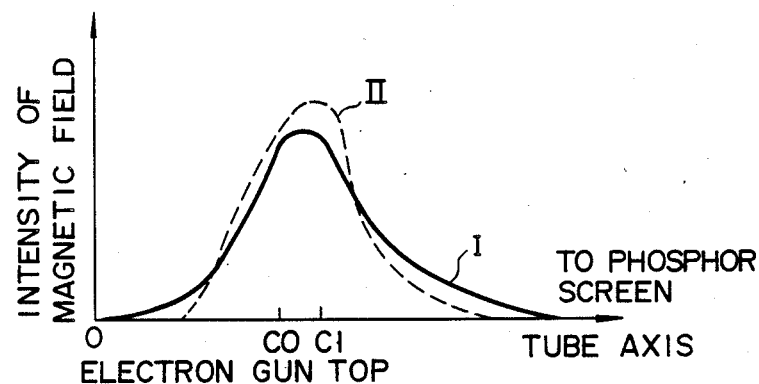
FIGS. 6A and 6B are diagrams representing how the deflection magnetic field generated by the deflection unit (FIGS. 4 and 5) is distributed along the axis of the cathode-ray tube.

First saddle coil 16 is so designed that a combination of this coil 16 and toroidal coil 15 has a positive cross convergence characteristic. More specifically, saddle coil 16 generates a pincushion magnetic field. When this magnetic field interacts with the magnetic field generated by troidal coil 15, the positive cross convergence characteristic shown in FIG. 2A will be obtained. In addition, as is shown in FIG. 6A, the deflection center C1 of the horizontal deflection magnetic field (curve II in FIG. 6A) generated by first saddle coil 16 is located further to electron gun assembly 10 than the deflection center C0 of the vertical deflection magnetic field (curve I in FIGS. 6A and 6B) generated by troidal coil 15.

Figure 6B:
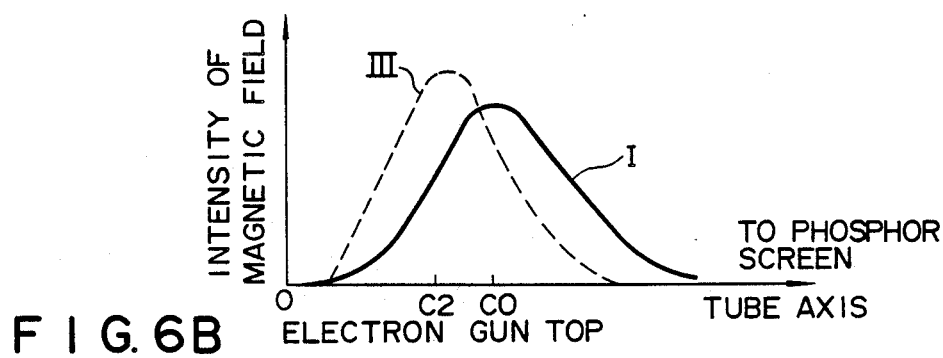

Second saddle coil 17 is so designed that a combination of this coil 17 and troidal coil 15 has a negative cross convergence characteristic. More specifically, saddle coil 17 generates a barrel magnetic field. When this magnetic field interacts with the magnetic field generated by troidal coil 15, the negative cross convergence characteristic shown in FIG. 2B will be obtained. In addition, as is shown in FIG. 6B, the deflection center C2 of the horizontal deflection magnetic field (curve III in FIG. 6A) generated by second saddle coil 17 is located closer to electron gun assembly 10 than the deflection center C1 of the horizontal deflection magnetic field generated by first saddle coil 16, with respect to the center C0 of the vertical deflection magnetic field (curve I in FIGS. 6A and 6B) generated by troidal coil 15.

Figure 3:
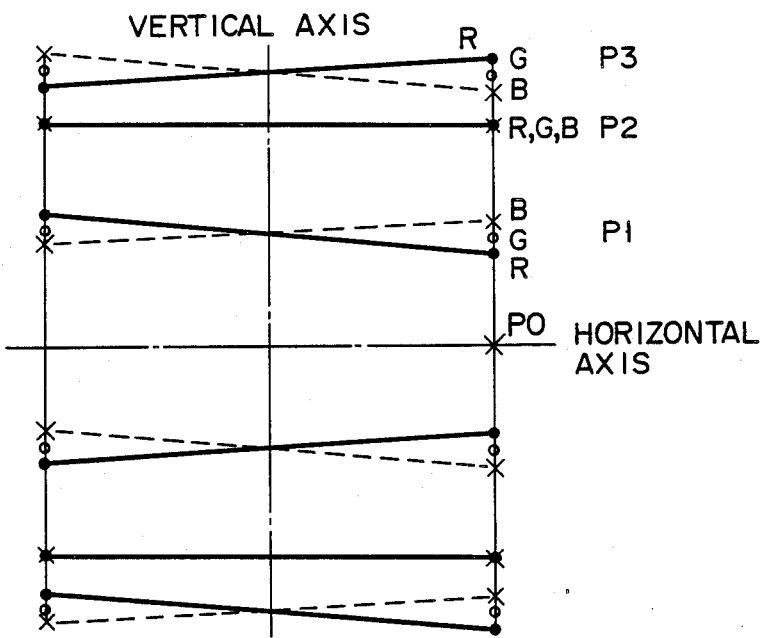
FIG. 3 is a diagram explaining the cross pattern appearing at the outer edge of each corner of the screen, and also the cross pattern appearing between the horizontal axis of the screen and the corner thereof.

Deflection unit 8, which is constituted by toroidal coil 15 (i.e.. a vertical deflection coil), first saddle coil 16 (i.e., a horizontal deflection coil), and second saddle coil 17 (i.e., a horizontal deflection coil), has the specific cross convergence characteristic shown in FIG. 3, when the same deflection current is supplied to both saddle coils 16 and 17.

Figure 7:
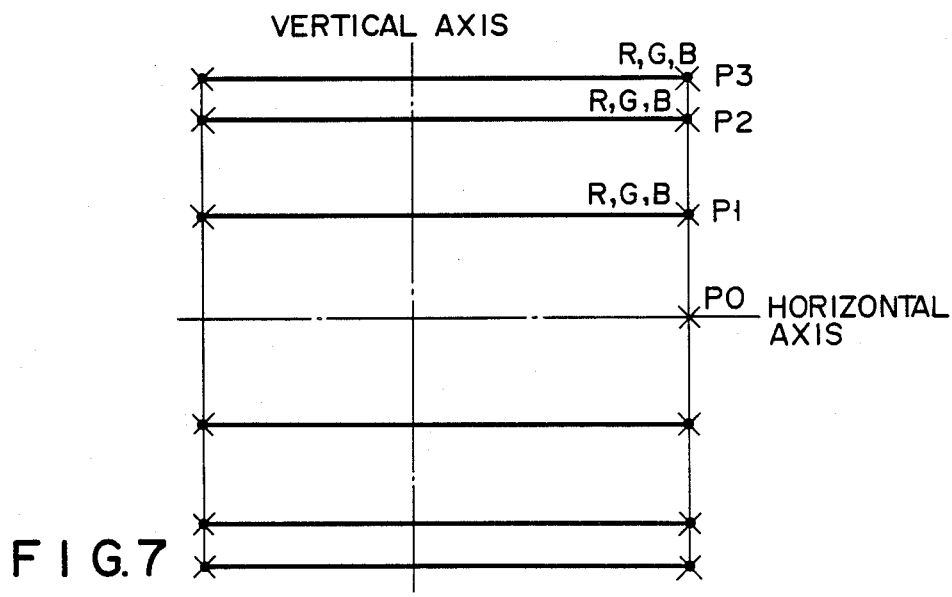
FIG. 7 is a diagram explaining the convergence characteristic of a color cathode-ray apparatus according to the invention.

First saddle coil 16 generates a pincushion magnetic field, and second saddle coil 17 generates a barrel magnetic field. These magnetic fields are combined, thus eliminating the convergence error on the horizontal axis of phosphor screen 2, as is illustrated in FIG. 7. Moreover, in order to eliminate the convergence error on the entire surface of phosphor screen 2, deflection currents $I_B$ and $I_C$, whose waveforms are shown in FIGS. 8A, 8B and 8C, are supplied from deflection current source 20 to first and second saddle coils 16 and 17, respectively. More specifically, to deflect the electrons beams vertically and thereby apply them to point P1 located between the horizontal axis of screen 2 and a corner of screen 2 (FIG. 7), currents $I_B$ and $I_C$ are applied to coils 16 and 17, wherein $|I_B| < |I_C|$. To deflect the electrons beams vertically and thereby apply them to point P2 in the corner of screen 2, currents $I_B$ and $I_C$ are supplied to coils 16 and 17, where $I_B = I_C$. Further, in order to deflect the beams vertically and thereby apply them to point P3 at the outer edge of the screen corner, currents $I_B$ and $I_C$ are supplied to coils 16 and 17, where $|I_B| > |I_C|$. When the relation between horizontal deflection currents $I_B$ and $I_C$ is changed in this way, the cross convergence over the entire screen will be improved.

FIG. 9 is a circuit diagram of deflection current source 20. Vertical deflection current $I_A$ is supplied to input terminals 26 and 27. Saturable reactors 24 and 25 are provided whose reactance can be adjusted and whose saturation points can be adjusted by permanent magnets 28 and 29. The primary ends of these reactors 24 and 25 are connected between input terminals 26 and 27, on the one hand, and vertical deflection coil 15, on the other. Horizontal deflection current $I_O$ is supplied to input terminals 22 and 23. Horizontal deflection coil 16, which consists of two coils, is connected in parallel to input terminals 22 and 24. Horizontal deflection coil 17, also consisting of two coils, is coupled in parallel to input terminals 22 and 24. The secondary ends of reactors 24 and 25 are connected between horizontal deflection coils 16 and 17, on the one hand, and input terminal 22, on the other. Therefore, current $I_O$ is modulated by vertical deflection current $I_B$, and currents $I_B$ and $I_C$ (FIGS. 8B and 8C) are supplied to horizontal deflection coils 16 and 17, respectively. Currents $I_B$ and $I_C$ are changed in accordance with the degree of vertical deflection of the electron beams, and the convergence error is corrected in accordance with the positions on screen 2 where the beams are applied. As a result, neither a positive cross pattern nor a negative cross pattern is formed on screen 2.

The circuit shown in FIG. 9 can be replaced by a similar circuit having saturable reactors. Further, saturable reactors 24 and 25 can be modulated by the magnetic flux leaking from vertical deflection coil 15, not by the vertical deflection current. It is also possible that two horizontal deflection currents $I_B$ and $I_C$ can be supplied from two independent current sources. Moreover, various circuit elements can be utilized to adjust the reactances of saturable reactors 24 and 25.

Figure 10:
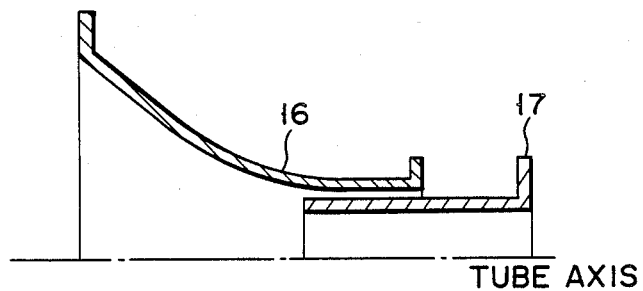
FIG. 10 is a sectional view showing a modification of the deflection unit shown in FIG. 5.

As is shown in FIG. 5, first saddle coil 16 is wrapped around almost entire second saddle coil 17. Alternatively, as is illustrated in FIG. 10, coil 16 can be positioned so that only its rear end portion surrounds second saddle coil 17. When coil 16 is so arranged, it will generates a magnetic field partly overlapping the magnetic field generated by second saddle coil 17. Further, vertical deflection coil 15, which is a toroidal coil, can be replaced by a saddle coil.

Figure 11:
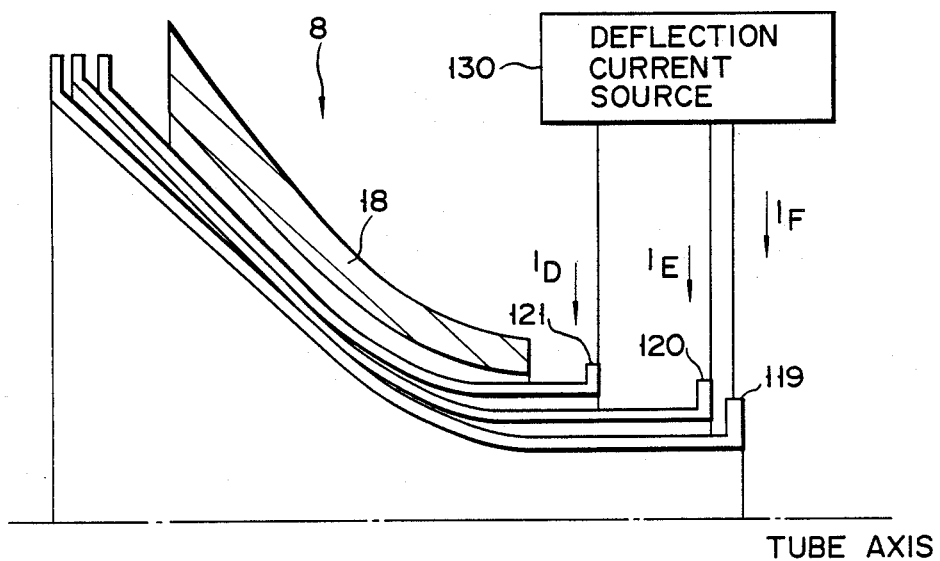
FIG. 11 is a sectional view illustrating another modification of the deflection unit shown in FIG. 5.

FIG. 11 shows another deflection unit 8 according to the present invention. This deflection unit comprises one horizontal deflection coil 119 and two vertical deflection coils 120 and 121. These coils 119, 120 and 121 are saddle coils. Coils 120 and 121 generate vertical deflection magnetic fields which have different centers of deflection. The deflection center of coil 120 is defined between coil 121 and electron gun assembly 10. The combination of coils 120 and 119 exhibits a positive cross convergence characteristic shown in FIG. 2A, whereas the combination of coil 121 and coil 119 presents the negative cross convergence characteristic shown in FIG. 2B. Further, the combination of coils 119, 120 and 121 will have the cross convergence characteristic shown in FIG. 3 when deflection currents $I_D$ and $I_E$ supplied to saddle coils 120 and 121 are equal. Horizontal deflection coil 119 generates a magnetic field which is either uniform or a slightly pincushion-shaped. First vertical deflection coil 120 generates a pincushion magnetic field. Second vertical deflection coil 121 generates a barrel magnetic field.

Figure 12:
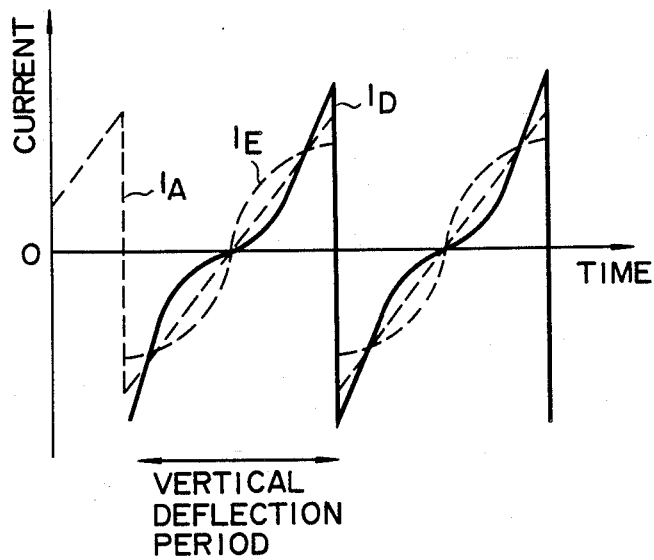
FIG. 12 shows the waveform of an AC current which is supplied to the first and second vertical deflection coils incorporated in the deflection unit shown in FIG. 11.

In deflection unit 8 shown in FIG. 11, deflection current source 130 supplies deflection currents $I_F$, $I_D$ and $I_E$ to horizontal deflection coil 119, first vertical deflection deflection coil 120, and second vertical deflection coil 121, respectively. Currents $I_D$ and $I_E$ have such waveforms as are shown in FIG. 12. To deflect the electron beams vertically to a relatively small degree, current $I_D$ is smaller than current $I_E$, whereby the positive cross pattern is eliminated. On the other hand, to deflect the beams vertically to a relatively large degree, current $I_E$ is smaller than current $I_D$, whereby the negative cross pattern is eliminated. As a result, a good convergence characteristic is achieved all over screen 2.

Figure 13:
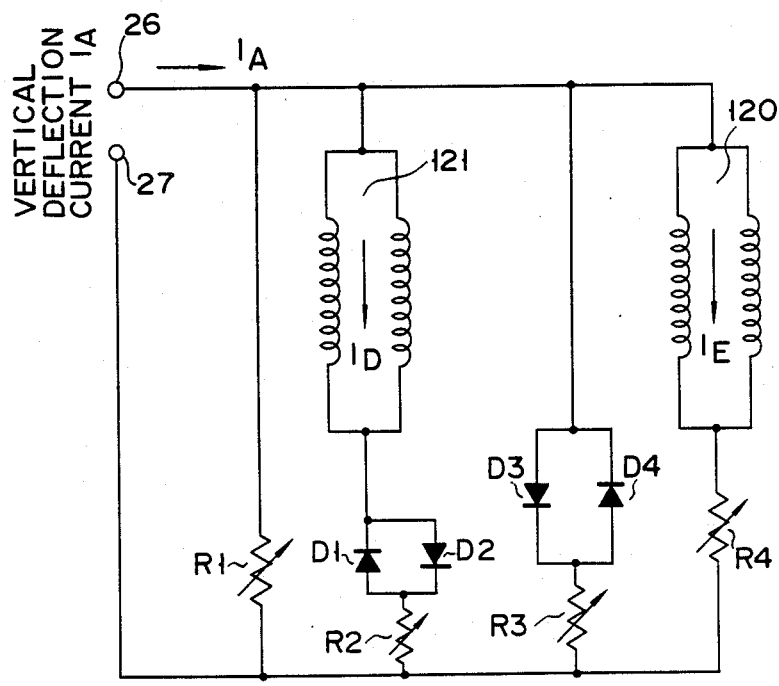
FIG. 13 is a circuit diagram showing the deflection current source shown in FIG. 11.

FIG. 13 shows a modification of deflection current source 130 (FIG. 11). The deflection current supplied to input terminals 26 and 27 is converted into currents $I_D$ and $I_E$ having the waveforms illustrated in FIG. 12, due to the non-linear current-voltage characteristic of diodes D1 to D4. Deflection currents $I_E$ and $I_D$ are supplied to first vertical coil 120 and second vertical coil 121, respectively. Currents $I_E$ and $I_D$ can be adjusted by changing the resistances of variable resistors R1 to R4.

In the embodiments described above, the centers of deflection of the deflection magnetic fields are shifted, and the distribution of intensity of these fields is changed. The centers of deflection and the distribution of intensity are determined by the desired loci of the electron beams. The centers of deflections are identical with the centers of gravity of the coils, or with the positions where the magnetic fields are most intense, in most color cathode-ray tubes.

The embodiment described above uses a combination of coils which are different both in intensity distribution and in center of deflection. According to the invention, a combination of coils which are different in only intensity distribution or only in magnetic field shape such as barrel and pincushion can be used, though these coils can correct a cross convergence error less effectively than that described up to here.

As has been described, since the first and second horizontal deflection coils generate a pincushion magnetic field and a barrel magnetic field, the changes in the horizontal deflection currents flowing in these coils are minimized during the vertical deflection period. Hence, these current can be modulated easily. In addition, since the distance between the center of deflection of the horizontal deflection coils is short, it is easy to manufacture the deflection unit (i.e., the deflection yoke).

The "center of deflection" of any coil used in the invention may be regarded as either the center of gravity of the coil or the point where the deflection magnetic field generated by the coil is most intense.

The color cathode-ray apparatus according to the present invention has a good convergence characteristic all over the phosphor screen, it is greatly useful from an industrial point of view.

What is claimed is:

1. A color cathode-ray apparatus comprising:
   an evacuated envelope having a tube axis and horizontal and vertical axes intersecting the tube axis at right angles and intersecting each other at right angles;
   a phosphor screen incorporated within said evacuated envelope;
   an in-line electron gun assembly for emitting three electron beams toward said phosphor screen;
   horizontal deflection means for generating a horizontal deflection magnetic field thereby deflecting the electron beams along said horizontal axis;
   first and second vertical deflection means for generating a vertical deflection magnetic field thereby deflecting the electron beams along said vertical axis, said first vertical deflection means including a first pair of deflection coils having a first deflection center, for generating a first magnetic field, and said second vertical deflection means including a second pair of deflection coils having a second deflection center, for generating a second magnetic field, said first and second deflection centers being located at different points on the tube axis and said second deflection center being defined between said first deflection center and said electron gun assembly; and
   current-supplying means for supplying a horizontal deflection current, a first vertical deflection current and a second vertical deflection current to said horizontal deflection means, said first pair of deflection coils and said second pair of deflection coils, respectively, thereby energizing said horizontal deflection means and said first and second pair of deflection coils, and first and second vertical deflection currents being changed in different manners, in accordance with a degree to which the electron beam are to be deflected vertically.

2. The color cathode-ray apparatus according to claim 1, wherein said phosphor screen has corner regions each having an outer edge, and intermediate regions between said horizontal axis and said corner regions, and said first and second vertical deflection currents are equal in order to apply the electron beams to a specified point in any corner region.

3. The color cathode-ray apparatus according to claim 2, wherein said first vertical deflection current has an absolute value smaller than that of said second vertical deflection current in order to apply the electron beams to a specified point in any intermediate region.

4. The color cathode-ray apparatus according to claim 3, wherein said first vertical deflection current has an absolute value greater than that of said second vertical deflection current in order to apply the electron beams to the outer edge of any corner region.

5. The color cathode-ray apparatus according to claim 3, wherein said horizontal deflection means generates a magnetic field which is either uniform or slightly pincushion-shaped.

6. The color cathode-ray apparatus according to claim 1, wherein said first magnetic field is a pincushion type and said second magnetic field is a barrel type.

7. A color cathode-ray apparatus comprising:
   an evacuated envelope having a tube axis and horizontal and vertical axes intersecting the tube axis at right angles and intersecting each other at right angles;

a phosphor screen incorporated within said evacuated envelope;

an in-line electron gun assembly for emitting three electron beams toward said phosphor screen;

first and second vertical deflection means for generating a vertical deflection magnetic field thereby deflecting the electron beams along said vertical axis each of said first and second vertical deflection means having a pair of coils;

horizontal deflection means for generating a horizontal deflection magnetic field thereby deflecting the electron beams along said horizontal axis, said horizontal deflection means including a first deflection coil having a first deflection center, for generating a first magnetic field, and a second deflection coil having a second deflection center, for generating a second magnetic field, said first and second deflection centers being located at different points on the tube axis and said second deflection center being defined between said first deflection center and said electron gun assembly; and current-supplying means for supplying a vertical deflection current, a first horizontal deflection current and a second horizontal deflection current to said first and second vertical deflection means, said first deflection coil and said second deflection coil, respectively, thereby energizing said first and second vertical deflection means and said first and second deflection coil, and first and second horizontal deflection currents being changed in different manners, in accordance with a degree to which the electron beams are to be deflected horizontally.

8. The color cathode-ray apparatus according to claim 7, wherein said phosphor screen has corner regions each having an outer edge, and intermediate regions between said horizontal axis and said corner regions and said first and second horizontal deflection currents are equal in order to apply the electron beams to a specified point in any corner region.

9. The color cathode-ray apparatus according to claim 8, wherein said first horizontal deflection current has an absolute value greater than that of said second horizontal deflection current in order to apply the electron beams to a specified point in any intermediate region.

10. The color cathode-ray apparatus according to claim 9, wherein said first horizontal deflection current has an absolute value less than that of said second horizontal deflection current to order to apply the electron beams to the outer edge of any corner region.

11. The color cathode-ray apparatus according to claim 7, wherein said first and second vertical deflection means generate a magnetic field which is either uniform or slightly pincusion-shaped.

12. The color cathode-ray apparatus according to claim 7 wherein said first magnetic field is a pincushion type and said second magnetic field is a barrel type.

13. A color cathode-ray apparatus comprising:
an evacuated envelope having a tube axis and horizontal and vertical axes intersecting the tube axis at right angles and intersecting each other at right angles;

a phosphor screen incorporated within said evacuated envelope;

an in-line electron gun assembly for emitting three electron beams toward said phosphor screen;

first and second vertical deflection means for generating a vertical deflection magnetic field thereby deflecting the electron beams along said vertical axis each of said first and second vertical deflection means including a pair of deflection coils;

horizontal deflection means for generating a horizontal deflection magnetic field thereby deflecting the electron beams along said horizontal axis, wherein one of said first and second vertical deflection means and said horizontal deflection means including a first deflection coil for generating a barrel magnetic field, and a second deflection coil for generating a pincushion magnetic field; and current-supplying means for supplying a main deflection current, a first deflection current and a second deflection current to said other deflection means, said first deflection means and said section deflection means, respectively, thereby energizing said vertical and horizontal deflection means, said first and second deflection currents being changed in different manners, in accordance with a degree to which the electron beams are to be deflected.

* * * * *